United States Patent [19]

Pionchon

[11] Patent Number: 5,200,890
[45] Date of Patent: Apr. 6, 1993

[54] COMPUTERIZED BRIDGE GAME INCLUDING STORAGE OF DEALS USED FOR CONSTRUCTING PLAYERS

[75] Inventor: Philippe Pionchon, Paris, France

[73] Assignee: Syllogy S.A., Paris, France

[21] Appl. No.: 381,736

[22] PCT Filed: Nov. 9, 1988

[86] PCT No.: PCT/FR88/00553
§ 371 Date: Jul. 6, 1989
§ 102(e) Date: Jul. 6, 1989

[87] PCT Pub. No.: WO89/04523
PCT Pub. Date: May 18, 1989

[30] Foreign Application Priority Data

Nov. 10, 1987 [FR] France ............... 87 15589

[51] Int. Cl.⁵ ............................................. A63F 1/00
[52] U.S. Cl. ............................. 364/410; 273/148 R
[58] Field of Search ............... 273/1 E, 149 P, 148, 273/149 R; 364/410–412; 395/11, 902

[56] References Cited

U.S. PATENT DOCUMENTS

| | | | |
|---|---|---|---|
| 3,768,813 | 10/1973 | Reynolds | 273/151 |
| 4,009,522 | 3/1977 | Borianne | 434/129 |
| 4,072,310 | 2/1978 | Beam | 273/85 CP |
| 4,159,581 | 7/1979 | Litchtenberg | 273/149 P |
| 4,173,342 | 11/1979 | DeCorlieu-Ferran | 273/148 R |
| 4,373,719 | 2/1983 | Nelson et al. | 273/1 E |
| 4,436,324 | 3/1984 | Barton | 273/285 |
| 4,534,562 | 8/1985 | Cuff et al. | 273/149 R |
| 4,822,050 | 4/1989 | Normand et al. | 273/149 R |
| 4,822,282 | 4/1989 | Weinstein | 434/129 |
| 4,886,272 | 12/1989 | Adise | 273/148 R |
| 5,043,889 | 8/1991 | Lucey | 364/412 |

OTHER PUBLICATIONS

"Computer Bridge-a Challenge For AI", Eick et al. Inspec Abstract No:C91025722, 1986.
"Computer Bridge", Thomas Throop, pp. 69–77, 116–134, 1983.

Primary Examiner—Gail O. Hayes
Attorney, Agent, or Firm—Bell, Seltzer, Park & Gibson

[57] ABSTRACT

The invention relates to a method and to a bridge game using a computer system comprising: a board (10) having a microprocessor (28), a memory (30, 32) and input-/output units such as a display screen, an alphanumeric keyboard, and a playing card reader, which are controlled by the microprocessor (28); a module (42) for storing prerecorded deals; and an intelligent play module (46) including a master microprocessor and slave microprocessor (54); the recorded deal module (42) and the intelligent play module (46) are connectable and disconnectable at will relative to the microprocessor (28) in the board (10).

19 Claims, 5 Drawing Sheets

COMPUTERIZED BRIDGE GAME INCLUDING STORAGE OF DEALS USED FOR CONSTRUCTING PLAYERS

BACKGROUND OF THE INVENTION

The invention relates to a method and an apparatus for an electronic bridge game.

The commercial success of electronic chess games has encouraged manufacturers to make electronic bridge games, but the undertaking has turned out to be much more difficult than for chess, since the bridge game apparatus must be capable of playing with one, two, three, or four players actually present, and it cannot make do, during play, with determining the best course of action over four or five turns ahead.

Bridge game apparatuses proposed in the past are not satisfactory, for numerous reasons:

in these machines playing cards are replaced by luminous symbols, and this is less attractive;

they do not allow four people present to play together; and they are incapable of giving an explanation or displaying a comment, even briefly, on an essential stage of the game.

In addition, although prior machines are capable of bidding fairly well in most cases, they turn out to be extremely poor and particularly unsatisfactory in card play.

SUMMARY OF THE INVENTION

The object of the invention is to provide a method and an apparatus for a bridge game, enabling the drawbacks of presently known apparatuses to be mitigated.

In particular, one object of the invention is to provide a method and an apparatus for a bridge game enabling three or four people present to play using deals prerecorded in memory, in which case the apparatus of the invention acts as a bridge tutor.

Another object of the invention is to provide a method and an electronic bridge game enabling, one, two, three, or four people present to play either on recorded deals or else on deals dealt by chance, either with or without assistance from the apparatus during bidding, opening, and card play.

Another object of the invention is a method and an apparatus for a bridge game enabling one or more people present to play bridge with the assistance of the apparatus at highest competition level.

The invention thus provides a method of playing bridge by means of a computer system comprising a microprocessor, memories, and input/output units such as at least one display screen, an alphanumeric keyboard, and a playing cardreader, the method being characterized in that it consists in using the microprocessor means to control the various input/output units in order to:

record the number of players present and their places;

select a deal in a memory containing a predetermined number of recorded deals;

reconstitute the selected deal by reading the playing cards while the cards are being dealt and displaying the place of the player to receive each card as read; and input each bid from each player present, compare that bid with corresponding bid prerecorded in the memory, correct it if necessary, and then display the final contract, together with prerecorded comments, and keep a score.

This method of the invention thus allows three or four people present to play bridge on data prerecorded in memory together with assistance from the system, at least with respect to bidding, and it allows them always to play an optimum contract.

The people also have the pleasure of playing with bridge cards which are read by a reader of an appropriate type with which the system is fitted.

According to another characteristic of the invention, the method also consists in displaying the bid made by a player so long as it is identical with the bid prerecorded in memory, and otherwise in requesting the same player to make a different bid and then in displaying the correct bid as recorded in the memory.

In variant implementations, this method further consists, after card play by the players present, in displaying the essential stages of the game prerecorded in memory together with an appropriate commentary, or else in replaying the entire card game for the edification of the players present and by way of demonstration while displaying commentaries explaining the more important stages of play.

The invention also provides a method of playing bridge by means of a computer system comprising a microprocessor, memories, and input/output units such as at least one display screen, an alphanumeric keyboard and a playing card reader, characterized in that the method consists in:

controlling said input/output units by means of the microprocessor; and analyzing the essential stages of the game (bidding, opening, card play) on an arbitrary deal when taking the place of at least one player, said analysis being performed by means of a second computer system comprising microprocessors and memories containing knowledge bases (also referred to as "knowledge banks") with the rules of the game (for bidding, for opening, and for card play), fact bases (also referred to as "data bases") containing all of the information accessible to the replaced player, and inference engines for applying the rules of the knowledge bases to the information in the fact bases, for recording significant results, and for updating the fact bases, in order to determine each action of the player replaced by the second computer system.

This method thus makes it possible for one, two, three, or four people present to play bridge with assistance from the system on a predetermined deal or on a random deal, with the system being capable of replacing one, two, three, or even four players and being equipped with computer means which are sufficiently powerful to enable it to play at the highest level.

According to another characteristic of the invention, this method consists, for bidding, in selecting a first knowledge bank in the memory of the second computer system, said bank containing rules for decoding bids made by the other players, a second knowledge base containing rules for producing bides, five fact banks (also referred to as "data bases") respectively containing information on the cards held by the player replaced by the system, information on cards assumed to be held by its partner, information deduced from the bids made by the replaced player, information on the cards held by said player and liable to be held by its partner, and information deduced from the bids of the opponents, then in applying the rules of the knowledge banks successively to the information in the fact banks in order to determine the best bid.

This determination takes place in three stages which consist initially in decoding the bid made by the partner of the replaced player and in recording the corresponding information, then in producing the bid of the replaced player and recording the corresponding information, and finally in decoding this bid by means of the rules in the second knowledge bank and in recording the corresponding information.

Any bids made by the opponents of the replaced player are decoded, and the results are stored in a fact bank.

According to another characteristic of the invention, the method consists, for opening in selecting two knowledge banks containing rules for selecting a suit and rules for selecting a card within a suit, and four fact banks containing information corresponding respectively to the cards of the replaced player, to that player's bids, to the bids of its partner, and to the bids of their opponents, then initially selecting a suit by applying the corresponding rules to the fact banks, and subsequently determining the opening card in a manner similar to that in which the opening suit was determined.

The method also consists, for card play, in not selecting those fact banks which contain the cards of the opponents of the replaced player when the replaced player is the declarer, and in selecting them and using them when the replaced player is an opponent of the declarer.

The card play of the system is thus quite regular and corresponds to that of a physical person when the player replaced by the system is the declarer, whereas it is always at an excellent level when the system replaces an opponent of the declarer, thereby enabling the declarer to play at the highest level at which he or she is capable.

More precisely, for each card to be played, the method consists initially in determining which cards should not be played, then in simulating play using the remaining cards by proceeding as follows:

dynamic analysis of play context and establishing a dynamic fact base;

tactical analysis of play, suit-by-suit and simulating the game in part; and then strategic analysis of the entire game with full simulation using all suits.

The method also consists in continuously rechecking the facts of the dynamic fact base, in changing them if necessary each time new information is acquired, and in repeating all of the simulations each time new information is acquired which was not previously known or predicted.

The information recorded in the dynamic fact base comprises firstly information such as the distribution of the cards in the various suits, the possibilities of the declarer or of dummy taking the lead, and suits to be ruffed (trumped), unblocked, or discarded, and secondly functions to be optimized consisting, for example, in taking the lead, giving the lead to partner, avoiding giving the lead to this or that opponent, attempting to finesse a card, etc.

The invention also provides a bridge game apparatus comprising a microprocessor, memories, and input/output units including at least one alphanumeric keyboard, a display screen, and a playing card reader, the apparatus being characterized in that the above-mentioned microprocessor is intended essentially for controlling said input/output units and is connectable to at least one of the following two elements:

a prerecorded pre-dealt deal module comprising a memory is which the deals are recorded, and means for connection to the above-mentioned microprocessor, means being provided for selecting one of the deals recorded in the memory, for reconstituting the deal by dealing cards to the players, for inputting bids made by the players, for comparing them with bids recorded in the memory, and for displaying the optimum final contract together with prerecorded comments; and an intelligent play module comprising a set of microporcessors associated with memories containing knowledge banks corresponding to the rules of bridge for bidding, opening, and card play, and means for connecting said module to the above-mentioned microprocessor, means being provided for analyzing the various stages of the game on a given deal in the place of at least one player, and for determining during each stage of the game the best action for the replaced player.

The apparatus of the invention thus has the advantage of making it possible to select a mode of play and of equipment: three or four players present can play using deals prerecorded in the memory, in which case only the prerecorded deals module is used. If they have an intelligent play module, then one, two, three, or four players present can play with assistance from the system, either on a conventionally dealt set of hands (without using the prerecorded deals module), or else using a prerecorded deal selected from the memory of the deal module.

Advantageously, the prerecorded deal module and the intelligent play module are removable and connectable at will to the above-mentioned microprocessor controlling the input/output units. The intelligent play module comprises a master microprocessor associated with a read-only memory and with a working memory, together with slave microprocessor associated with read-only memories and with working memories and capable of executing independent tasks simultaneously under the authority of the master microprocessor.

The microprocessor for controlling the input/output units is conventionally housed in a board which, in accordance with the invention, comprises four display screens, four input keyboards, and four card readers, each screen being associated with a keyboard and a reader at a player position.

In a variant, the board may include a central display screen placed between two of the above-mentioned screens so that all three of them constitute a large-sized screen.

In addition, the board includes along its sides means such as display lamps, for indicating the locations of the cards dealt to at least one of the players.

The apparatus of the invention also includes an independent box including a playing card reader, an alphanumeric keyboard, and linking means via electrical conductors, infrared rays, or ultrasound, connecting it to the controlling microprocessor housed in the board.

This box is particularly useful for reading playing cards while they are being dealt, for inputting control information such as the number of players present, the selected playing mode, the vulnerable or non-vulnerable state of the players, etc. and also for inputting bids made by various players and inputting the cards they play.

BRIEF DESCRIPTION OF THE DRAWINGS

The invention will be better understood and other characteristics, details, and advantages thereof appear more clearly on reading the following description made by way of example and with reference to the accompanying drawings, in which.

DESCRIPTION OF THE PREFERRED EMBODIMENT

Figure 1:
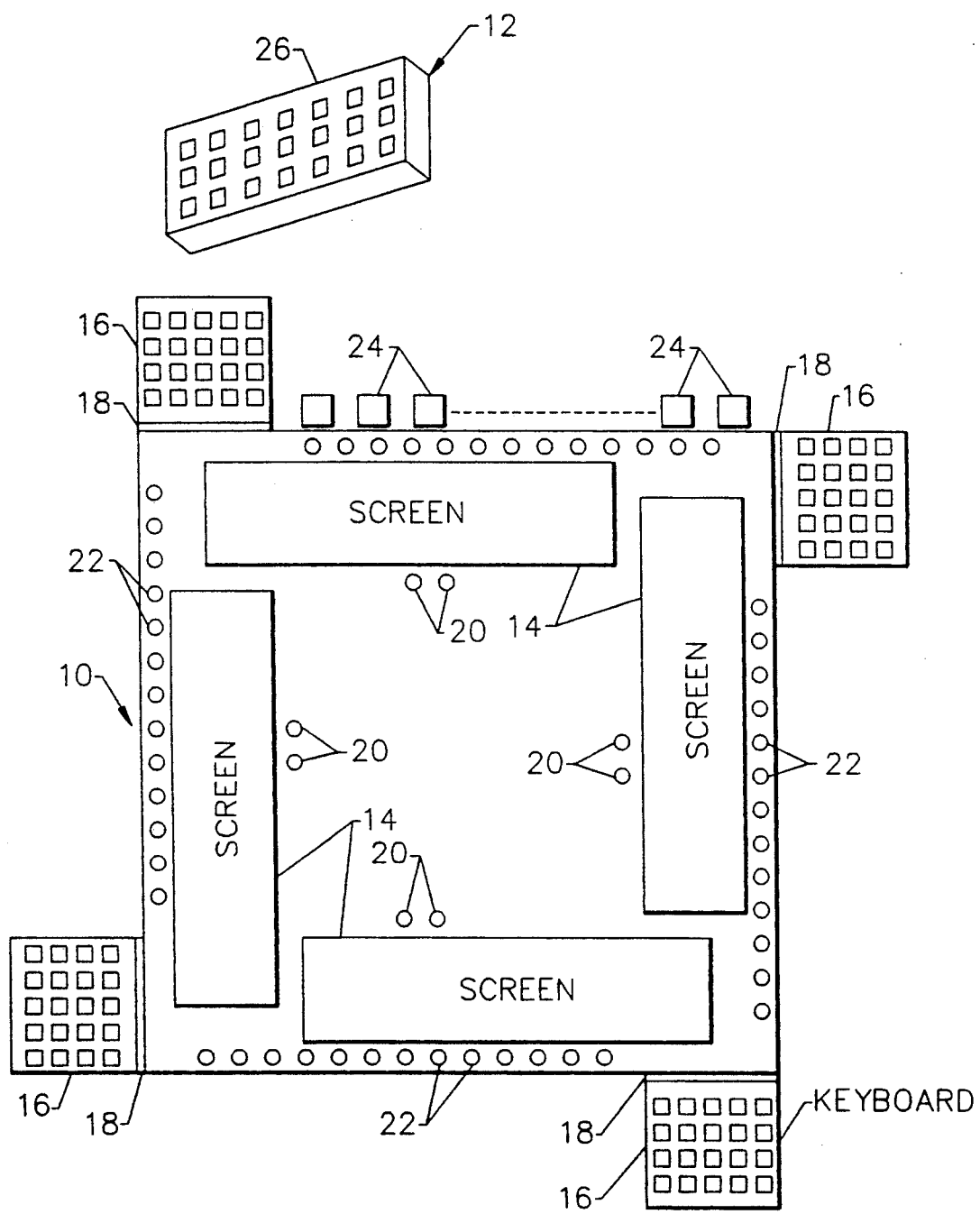
FIG. 1 is a diagram of the board and the box of apparatus in accordance with the invention.

The apparatus shown in FIG. 1 essentially comprises a square board 10, and at least one information input and control box 12.

The board 10 has four screens 14 disposed along its sides in such a manner as to make each of them visible to a given player. Each side of the board is associated with a keyboard 16 having alphanumeric keys, and is fitted with means 18 for reading playing cards, advantageously optical reader means through which it suffices merely to pass each card so as to enable it to be read and identified by a computer system housed in the board 10.

The board also includes one or two indicator lamps 20 placed adjacent to each of its side screens 14 and suitable for being switched on to indicate which player is to receive a card or is to bid, etc. Thirteen other indicator lamps 22 are placed along each of the sides of the board 10 in order to mark the locations of the playing cards 24 dealt to the players.

The input and control box 12 has playing card reader means on one of its faces and of the same type as the readers 18 associated with the keyboard 16, and on another face it has an alphanumeric keyboard 26 serving firstly to input system control information such as the number of players present, the selected mode of play, or the vulnerable or non-vulnerable status of the players, and also to input bids made by the various players and the various cards they play.

The box 12 is connected to computer system housed in the board 10 either by means of conventional electrical conductors, or else by infrared rays, or indeed by ultrasound.

Figure 2:
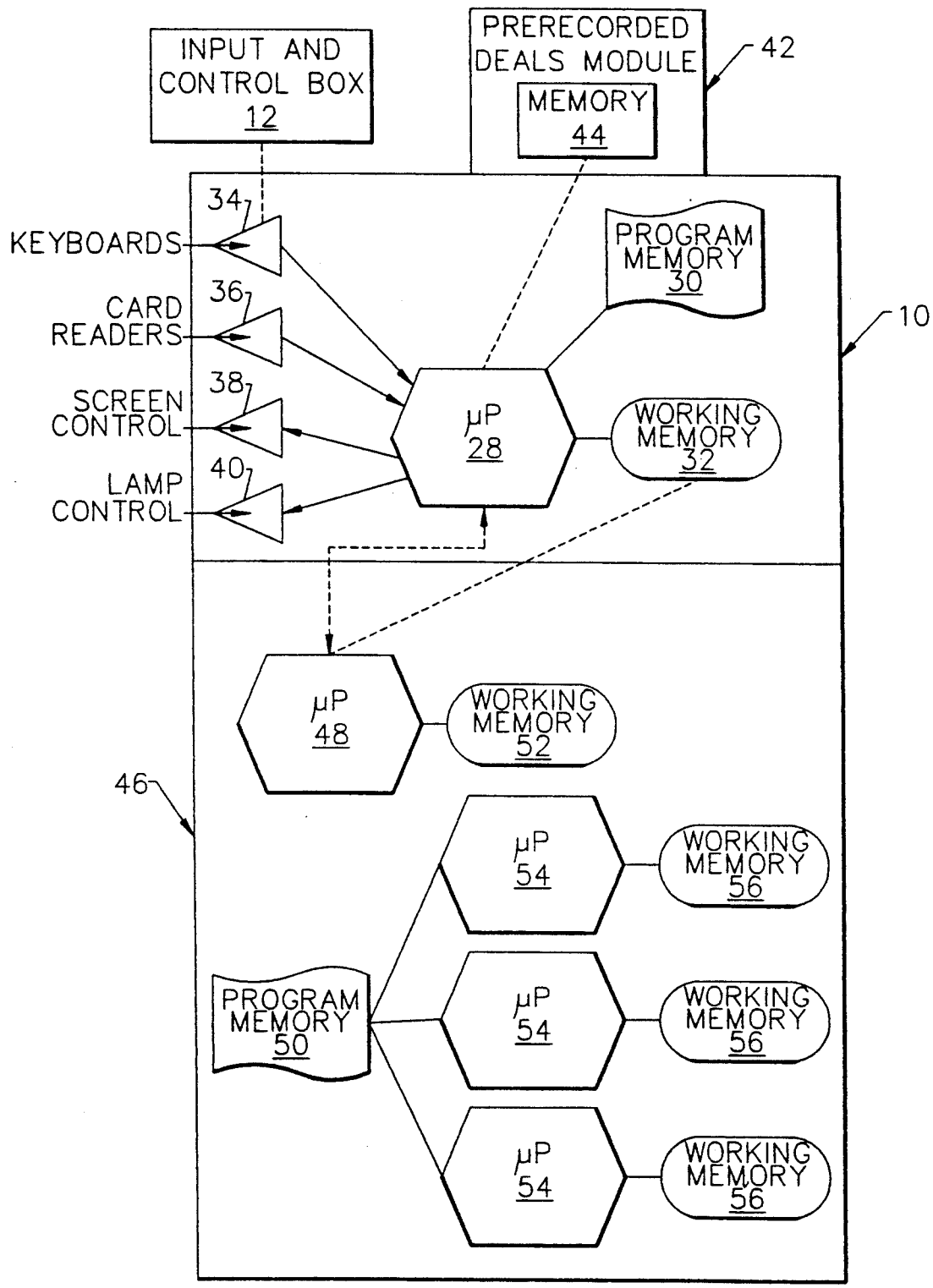
FIG. 2 is a diagram showing the structure of the computer systems within the apparatus.

FIG. 2 is a diagram showing the structure of the computer systems in apparatus of the invention. This figure shows the board 10 which contains a microprocessor 28 associated with a program memory 30, a working memory 32, and control circuits for input/output units, comprising in particular a circuit 34 for receiving information from the keyboards, a circuit 36 for receiving information from the card readers, a circuit 38 for controlling the display screens 14, and a circuit 40 for controlling the various indicator lamps 20 and 22, and optionally for controlling a loudspeaker producing sound signals with different notes for different players. A module 42 of prerecorded deals is associable with the computer system of the board 10 and essentially comprises a memory 44 in which a given number of deals are recorded, for example about 320 deals together with the corresponding bids, at least the most important stages of card play, and comments. These deals may present the players with bridge problems of increasing difficulty, and four deal modules may be provided at different levels; beginner; learner; competition; and high level competition. The deal module 42 is thus removable and includes conventional means for connection to the microprocessor 28 in the board 10.

The board 10 may also be associated with an intelligent play module 46 which comprises a second computer system together with means for connection to the computer system in the board 10. In outline, the intelligent play module 46 comprises a master microprocessor 48 associated with a program memory 50 and a working memory 52, and preferably a set of slave microprocessors 54 each associated with its own program memory and working memory 56 and connected in parallel to the master microprocessor 46 and its program memory 50, thereby enabling independent tasks to be executed simultaneously under the control of the master microprocessor 48.

Figure 3:
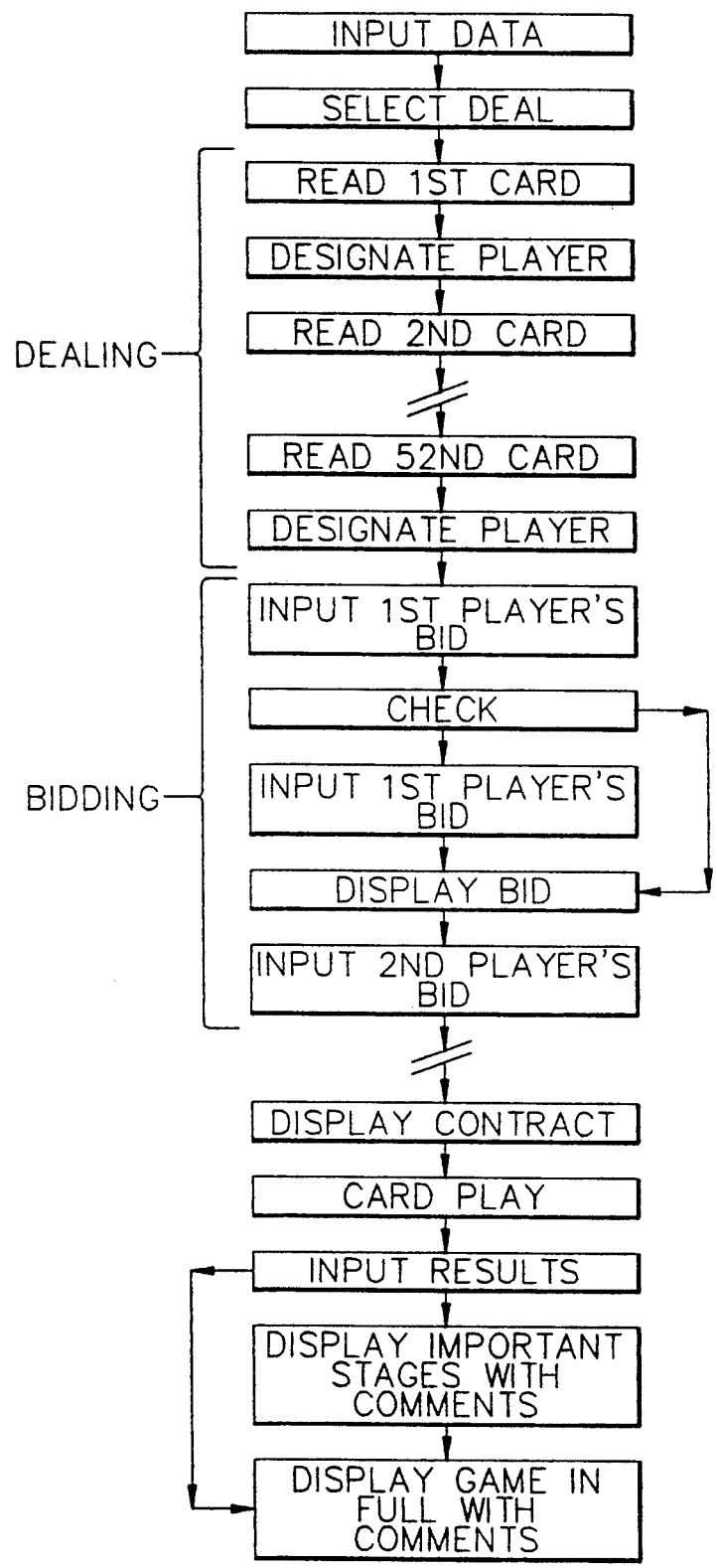
FIG. 3 is a flow chart of the various stages of play in an apparatus fitted solely with a recorded deal module.

The apparatus of the invention may be used either with the recorded deal module 42, or with the intelligent play module 46, or else with both modules 42 and 46. Its operation is initially described with reference to FIG. 3 for the case where it is used solely with the recorded deal module 42.

Under such circumstances there are three or four players present. One of the players holds the box 12, and by depressing appropriate keys on the keyboard 26 transmits control and play information to the computer system in the board 10, including the number of players present, their positions, the vulnerable or non-vulnerable state of the players, the selected mode of play, and possibly other information such as the conventions chosen by the players. Thereafter, by pressing an appropriate key on the keyboard, the player instructs the system to select one of the deals stored in the module 42. This selection may be performed randomly or arbitrarily (as with deal modules at learner level, competition level, or at high level competition level), or else it may obey an imposed logical order (appropriate to beginner level deal modules where it is preferable for players to encounter bridge problems in a logical order of increasing difficulty).

The player holding the box 12 then takes a pack of 52 playing cards and places it in a housing in the box, after which the player takes the first card from the pack, and in so doing passes it over the reader fitted to one of the faces of the box 12. The computer system tells the dealer which player position should receive the card as read, and it does this by switching on an indicator lamp 20 corresponding to the position of said player and/or by emitting a sound signal with a determined note. The cards are dealt in this way one after the other in strict obedience to the instructions given by the apparatus. When the apparatus has not managed to read a card properly, it gives a warning by switching on an appropriate indicator lamp and/or by generating a special tone of sound signal. The dealer must then pass the card over the card reader on the box 12 a second time.

After the cards have been dealt, bidding takes place in accordance with the mode of play initially selected (assisted mode, corrected assisted mode, tournament mode).

In assisted mode, each bidding player makes a bid out loud and also keys it in by means of the keyboard on the box 12. The keyed-in bid is displayed on the screens 14 is compared with the corresponding bid prerecorded in the memory. If the player has made the correct bid, i.e. if the bid is identical to the prerecorded bid, then the apparatus accepts it and tells the next player it is his or her turn to bid. If the first bid does not match the bid recorded in memory, then the apparatus tells the bidding player and asks him or her to make a new bid. If the new bid is correct, it is accepted and the apparatus moves on to the next player, otherwise the bid is refused, and the correct bid is displayed prior to the apparatus passing onto the next player. This continues until a final contract is contract prerecorded in the memory for the selected deal.

In corrected assisted mode, the bidding player does not bid out loud, but merely keys in the bid by means of a keyboard 16 or the keyboard on box 12. Regardless of whether this bid matches or does not match the bid prerecorded in memory, the apparatus displays the prerecorded bid on the screens 14 and moves onto the next player. Whenever the bid made by a player does not match the prerecorded bid, the apparatus awards penalty points to the player and these are tallied at the end of the game.

In tournament mode, the apparatus provides the players with no assistance during bidding. The contract reached is input and compared with the contract prerecorded in memory. Depending on the result of this comparison, the machine may display the prerecorded contract together with an appropriate commentary. This mode of play assumes that four players are present. In this case, a handicap may be attributed to each pair of players and keyed into the apparatus. When only three players are present, the mode of play selected must be assisted mode or corrected assisted mode, and the apparatus may replace the fourth player during bidding. However, during card play, the apparatus must be dummy, which means that one of the players may need to change sides. The cards are played by the players present, the contract reached is input and displayed, as are the number of points scored. The apparatus then displays a simple commentary on the card play, said commentary being prerecorded in the memory together with the selected deal and corresponding to a summary of the essential stages of play with pauses on critical tricks, accompanied by the display of an appropriate short commentary.

The recorded deal module 42 may also contain the full card play in its memory associated with each deal, particularly for the beginner level module. In this case, after the players present have finished card play, the apparatus displays on the screens the full card play as recorded in its memory, and important points are flagged and explained.

When used solely with a prerecorded deal module, apparatus of the invention has the advantages firstly of making the players present play the contract which is recorded in the memory together with the selected deal, which contract is theoretically the best possible contract, and secondly of assisting the players present in exactly the same way as would a bridge tutor.

In this type of utilization, the microprocessor 28 is used merely for controlling the various input/output units: the corresponding program recorded in the memory 30 presents no difficulty to the person skilled in the art and does not require any special knowledge about the game of bridge.

The apparatus of the invention may also be used with an intelligent play module 46, optionally in association with a recorded deal module 42. When an intelligent play module 46 is used, the apparatus can replace one, two, three, or even four players, and it plays bridge in the same way and under substantially the same conditions as would a person, while bidding, on opening, and during card play.

When the module 42 is not used, cards are dealt conventionally, i.e. the dealer deals the cards one by one in a clockwise order. Each card dealt to a player replaced by the apparatus is read by the reader on the box 12 and is placed at the position indicated by the switched-on display lamp 22 on the board 10.

When the prerecorded deal module 42 is used, the cards are dealt as described above for the case where the apparatus is used without an intelligent play module.

The information corresponding to the cards constituting the hand of a player replaced by the apparatus is recorded in a data bank or fact bank to which the system has access only when it is taking the place of that player.

Figure 4:
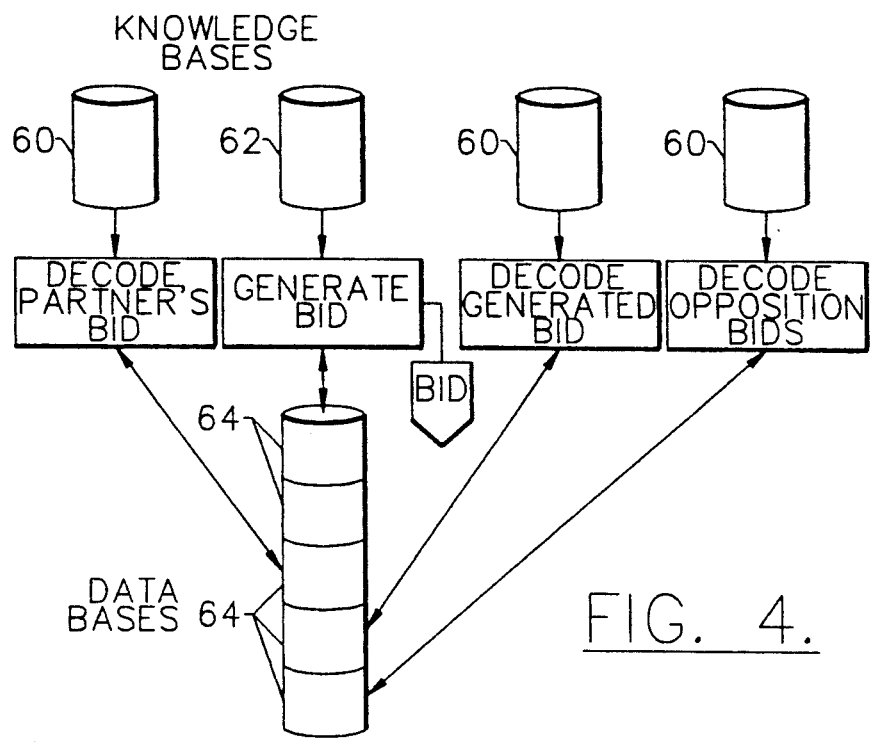
FIG. 4 is a flow chart showing, diagrammatically, how the computer system operates to produce bids.

The three stages of the game (bidding, opening, card play) are processed by different programs. The flow chart for the bidding program is shown diagrammatically in FIG. 4.

The system then comprises two knowledge banks 60 and 62, respectively, five fact banks 64, and inference engines for applying the knowledge in the banks 60 and 62 to the facts in the banks 64 in order to deduce new facts which are added to those recorded in the banks 64, and so on.

Knowledge bank 60 contains information corresponding exactly to the rules for decoding bids as heard by the player being replaced by the apparatus. Knowledge bank 62 contains information corresponding to rules for producing bids. The five fact banks 64 contain the following information:

information corresponding to the cards held by the player replaced by the apparatus;

information corresponding to the cards which the apparatus deems its partner is holding;

information corresponding to the set of cards held by both the replaced player and partner;

information corresponding to the cards which are held by the player replaced by the apparatus, as deduced from its own bids; and information deduced from the bids, if any, made by the opponents.

The method used by the apparatus to generate to bid has three essential stages:

decoding, by means of the rules in bank 60, the bids made by the partner of the replaced player;

generation of a bid by means of the rules in the bank 62; and decoding, by means of the rules in bank 60, of the bid made by the apparatus;

with each of these stages giving rise, by application of the rules to the corresponding facts, to new facts which are then recorded in the appropriate fact bank.

Similarly, bids made by the opponents of the player replaced by the apparatus are decoded in order to provide new information which is recorded in the corresponding fact banks.

While bidding is taking place, the apparatus which replaces a player is only fully informed about the cards held by that player, and it does not know which cards are held by its partner or its opponent.

Figure 5:
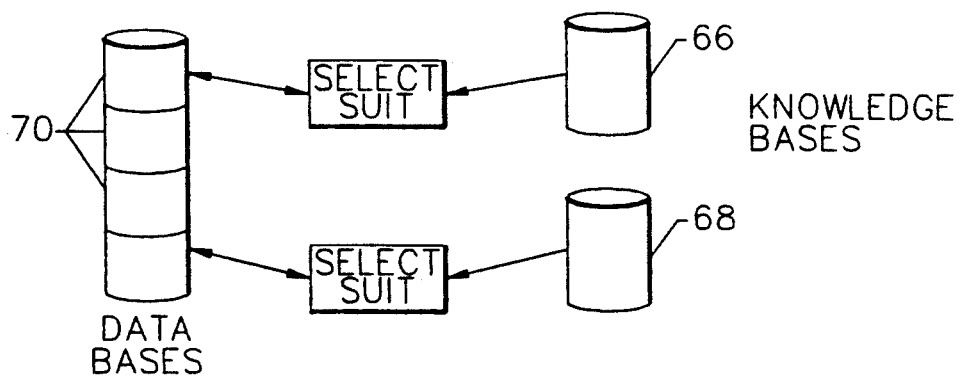
FIG. 5 is a similar view showing the operation of the system for opening.
Figure 6:
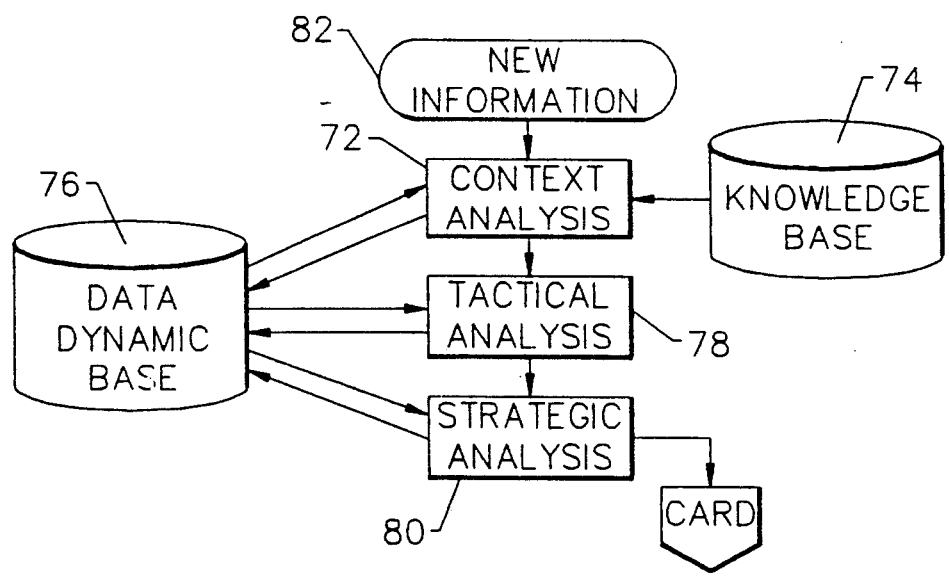
FIG. 6 is a similar view showing the operation of the system during card play.

The same applies when determining the opening card, and the corresponding flow chart is shown diagrammatically in FIG. 5. The program for determining the apparatus' opening card makes use of two knowledge banks respectively 66 and 68, and four fact banks 70. Knowledge bank 66 contains all of the rules for determining the suit with which to open, and bank 68 contains all of the rules for determining the opening card in a given suit. Fact banks 70 contain information respectively corresponding to the cards of the player replaced by the apparatus, to the bids made by the apparatus, to the bids made by its partner, and to the bids made by the opponents. The program for determining the opening card has two essential stages:

determining a suit; and
determining a card within that suit.

Inference engines apply the rules in the knowledge banks to the information contained in the corresponding fact banks and enrich the fact banks by information obtained in this way. When two suits may be used for opening, the program takes account of the quality of the two suits and weights each suit and each chosen card in that suit. Thereafter, the weights of the suit and the chosen card are summed and the sums of these weights are compared for both suits. The lower sum is selected. These weights may be previously recorded in the knowledge bases 66 and 68, or else they may be calculated from weights recorded in these bases.

In card play, the apparatus is aware of 26 cards when it replaces the declarer (the cards of the declarer and the cards in dummy). However, when the apparatus replaces an opponent of the declarer, it is preferable for it to be aware, after opening, of all of the cards of all of the players. In this way, when the apparatus is playing against the declarer it can play at the best possible level, which would not be true it if was only aware of the cards in its own hand and in dummy.

The card play program used by the apparatus includes a program 72 for dynamically analyzing the card play context, said program being fed from a knowledge bank 74 in order to constitute a dynamic fact bank 76, a game tactical analysis program 78 on a suit-by-suit basis with partial game simulation, and a strategic analysis program 80 with full game simulation using all suits.

The information recorded in the dynamic fact base 76 comprises:

the existence or non-existence of exposed flanks, of hands lacking entries into dummy or to the declarer, of communication suits, of blocking suits, of suits to be ruffed, to be unblocked, to be discarded, etc. . . . ;

functions to be optimized (entries to dummy or to the declarer, avoiding giving the lead to this or that opponent, trying a finesse for such and such a card, . . . );

adverse distributions which must be played against;
necessary or pessimistic locations of hidden honors and adverse distributions;
possible line(s) of play; and
selection criteria to be used during simulations.

All of the dynamic facts in the base 76 are reverified during play, and simulations are rerun each time an unforeseen fact 82 occurs. The functions recorded in the dynamic fact base 76 are optimized as a function of aims which also constitute dynamic facts since they take account of initiatives by the opponents and by the success or failure of maneuvers attempted.

This particular structure for the card play program provides great advantages. The time that would be required for performing strategic analysis together with full game simulation on all suits from the beginning of card play would be too long for such full simulation to be achievable in practice. The tactical game analysis program serves to determine which functions should be optimized and to greatly reduce the search space of the strategic analysis program. Overall game simulation for all suits is therefore performed taking account of optimums already determined for each player, and assuming that each player will play as well as possible, i.e. will play in the optimum manner as determined for that player by the system. Under such conditions, total card play simulation can be performed in restricted space and becomes possible in practice.

For example, if the system is playing as declarer, technical analysis will include determining the number of entries into dummy, in verifying whether this number is sufficient, and if not, in considering ways of optimizing this particular function.

Both during tactical analysis and during strategic analysis, the system considers for each trick the various ways each player may play and, for that trick, determines the optimum play for each player, beginning with the last player to play in that trick. When the optimum play for that player has been determined for that trick, the system then determines the optimum play for the preceding player in the trick, and so on.

By proceeding in this way, the system is capable, in a relatively short period of time, of determining the full card play for achieving a given contract, and it is capable, if necessary, of playing at a level corresponding to high level competition.

The following example shows how the system may respond in various ways to a given situation. Assume the following deal:

| NORTH (dummy) | Spades: | A 4 3 |
| --- | --- | --- |
| | Hearts: | 8 5 |
| | Diamonds: | K 10 8 5 3 |
| | Clubs: | 9 5 4 |
| SOUTH (declarer) | Spades: | K Q 7 |
| | Hearts: | A K J 10 |
| | Diamonds: | Q 9 |
| | Clubs: | A J 7 3 |

WEST opens with the jack of spades.

If the contract is two no trumps:

The system counts winning tricks in its hand and in dummy and observes that the contract can be achieved under all circumstances (three winning tricks in spades, three winning tricks in hearts, one winning trick in diamonds, and one winning trick in clubs). Consequently, the system takes the jack of spades as lead with its king of spades, and it then plays the queen of diamonds for the second trick, in order to take the trick or drop the ace of diamonds.

If the contract is in three no trumps:

In order to achieve the contract, the system must make an extra trick in diamonds. Since dummy is short of an entry and since diamonds may be distributed unfavorably, with EAST having the ace, the jack, and two small cards, the system takes the jack of spades as lead with the king of spades, and then plays the 9 of diamonds. EAST is then obliged to let the system take a trick or else to take the trick with the jack of diamonds. Next time diamonds are played, EAST must either play the ace or else let the trick be taken by declarer's queen If the contract is in four no trumps:

The system observes that it can win only if the opposition distribution of diamonds is favorable. Consequently, after the jack of spades has been lead, it takes the lead using the king of spades, and then plays the queen of diamonds for the second trick.

The various ways in which the system plays for this particular deal derive specifically from the way it optimizes various functions given the contract to be achieved.

Two program extracts are included in the description by way of example: the first extract concerns the bidding rules, while the second extract concerns function optimization and is usable both in tactical analysis and in strategic analysis of card play.

For example, the first program extract shows the rule for opening the bidding with four no trumps. For this purpose, the hand must have both minor suits, at least six cards in its second suit, at least three loosing tricks in all, and not more than three loosing tricks in clubs and three loosing tricks in diamonds.

The following rule of this first program extract concerns an opening bid of three in a minor suit.

The second program extract includes the following stages:

A: declaration of external routines
B: reset to zero;
B-C: calculating the differences between two possible lines of play;
C-D saving information;
D-E determining which player has the initiative that gives rise to the above-mentioned difference;
E-F: calling optimization functions; and
F: exit to another routine BX if none of the optimization routines attempted gives rise to a difference in the case under consideration.

```
OPEN PROCEDURE (var NUMBER:byte):
var
    C_C : t_Suit NAME;
begin
    case NUMBER
    of 1 :
{=========================================
if BIC = minor and LNG2CL >= 6
and loose >= 300 and loose c <= 300 and loose_d <= 300
Then open with 4 NO TRUMPS
========================================}
begin
suit := NO trump
with PLAYER [J C]
do it (twosuit=MIN)              and
     (lng2cl >= 6)               and
     (loosers >= 300 )           and
     (SUIT [CLUBS]. loosers <=300)    and
     (SUIT [DIAMONDS]. loosers <=300)
     then NIV := 4;
end ;
2: {=====================================================
       RULES FOR OPENING WITH A MINOR SUIT BARRAGE
========================================================}
{====================================
if LNGCL = 7 and TYCL = minor
and (TY2CL = minor or TY2CL inexisting) (so <> spades and <> hearts)
and LNG2CL < 5
and CTL < 4 and PHSA <= 9.7
and non-vulnerable and LVGT in [600..700]
and QHCL > 31 and      (position <> 3   ++++ cancelled )
then open 3 TYCL (long suit).
==================================}
begin
    with PLAYER [J_C]
    do if
         (lngcl = 7)      and
       MINOR (tycl)       and
       (MINOR (ty2cl)     or     (lng2cl < 4) and
         (lng2cl < 5)     and
         (ctl < 4)        and
         (phsa <= 9.7)    and
```

```
      not (VULNERABLE)        and
       (lvgt <= 700)           and
       (lvgt >= 600)           and
       (qhcl > 31)
          then begin NIV := 3; SUIT :=tycl;end
end;
3: {=================================================
   if LNGCL = 7 and TYCL = minor
and (TY2CL = minor or TY2CL inexisting) (so ◇ spades ανδ ◇ hearts)
and LNG2CL < 5
and CTL < 4 and PHSA <= 9.7
and vulnerable and LVGT in [650..700]
and QHCL < 31 and (POSITION ◇ 3 +++++ cancelled)
then open 3 TYCL (long suit)
=================================================}
begin
 with PLAYER [J_C]

do
       if    (lngcl = 7)              and
             MINOR (tycl)              and
             (MINOR (ty2cl)            or  (lng2cl < 4) ) and
             (lng2cl < 5)              and
             (ctl < 4)                 and
             (phsa <=9.7)              and
             VULNERABLE                and
             (lvgt >= 650)             and
             (lvgt <= 700)             and
             (qhcl > 31)
    ten begin NIV := 3; SUIT := tycl;end;
end;
4: {=================================================
if LNGCL = 7 and TYCL = minor
and (TY2CL = minor or TY2CL inexisting) so ◇ spades and ◇ hearts
and LNG2CL < 5
and CTL < 4 and PHSA <= 9.7
and vulnerable.favorable and LVGT in [600..700]
and QHCL > 23 and POSITION = 3
then open 3 TYCL (long suit)
=================================================}
begin
   with PLAYER [J_C]
     do if        (lngcl = 7)              and
                  MINOR (tycl)              and
                  (MINOR (ty2cl)            or (lng2cl < 4) ) and
                  (lng2cl < 5)              and
                  (ctl < 4).                and
                   (phsa <=9.7)                  and
                   VULNERABILITY=EAST-WEST)    and
                   (lvgt <= 700)             and
                   (lvgt >= 600)             and
                   (qhcl > 23)       and
                   (position=3)
     then begin NIV :=3;SUIT:= tycl;end;
end;
5: {=================================================
```

```
if LNGCL >= 8 and TYCL = MINOR
and (TY2CL = minor or TY2CL inexisting) so <> spades and <> hearts
and LNG2CL < 5
and NON-VULNERABLE
and LVGT <= 799
and LVGT > 600
and CTL < 4 et PHSA <= 9.7
then open 4 TYCL (long suit)
==================================================}
begin
  with PLAYER [J_C]
  do if
             (lngcl >= 8)                and
           MINOR (tycl)                  and
         (MINOR (ty2cl)         or  (lng2cl < 4)) and
       not (VULNERABLE)                  and
             (lng2cl < 5)                and
             (ctl < 4)                   and
             (lvgt >=600)                and
             (lvgt < 799)                and
             (phsa <=9.7)
    then begin NIV := 4; SUIT :=tycl;end
end;
6: {==================================================
if LNGCL >= 8 and TYCL = minor
and (TY2CL = minor or TY2CL inexisting) (so <> spades and <> hearts
and LNG2CL < 5
and VULNERABLE
and LVGT <= 799
and LVGT > 650
and CTL < 4 and PHSA <=9.7
then open 4 TYCL (long suit)
==================================================}
begin
  with PLAYER [J_C]
  do if    (lngcl >=8)             and
           MINOR (tycl)             and
           (MINOR (ty2cl)           or   (lng2cl < 4) and
           (VULNERABLE)             and
           (lng2cl < 5)             and
           (ctl < 4)                and
           (lvgt >=650)             and
           (lvgt < 799)             and
           (phsa <=9.7)
    then begin NIV :=4;SUIT :=tycl;end
end;
7: {==================================================
if TYCL = minor
if LNGCL = 7
and NBCMI > 10
and non-vulnerable
and PHSA <= 11
and CTL < 4
and LVGT >= 700
and LVGCL >= 500
  then open 4 TYCL (long suit)
==================================================}
```

```
begin
  with PLAYER [J_C]
  do if MINOR (tycl)          and
        (lngcl = 7)            and
        (phsa <= 11)           and
        (ctl < 4 )             and
        (nbcmi > 10)           and
        not (VULNERABLE)       and
        (lvgt >= 700)          and
        (lvgcl >= 500)
     then begin NIV := 4;SUIT := tycl;end;
end;
8: {=============================================
if TYCL = minor
if LNGCL = 7
and NBCMI > 10
and vulnerable
and PHSA <= 11
and CTL < 4
and LVGT >= 800
and LVGCL >=600
then open 4 TYCL (long suit)
=============================================}
begin
  with PLAYER [J_C]
  do if MINOR (tycl)          and
        (lngcl = 7)            and
        (nbcmi > 10)           and
        VULNERABLE             and
        (phsa <=11)            and
        (lvgt >= 800)          and
        (ctl < 4)              and
        (lvgcl >= 600)
     then begin NIV := 4:SUIT := tycl;end;
end;
9: {=============================================
if LNGCL >=8 and TYCL minor
and PHSA <= 13
and CTL < 4
and LVGCL >= 650
and LVGT >= 800
then open 5 TYCL (long suit)
=============================================}
begin
  with PLAYER [J_C]
  do if (lngcl >= 8)          and
        MINOR (tycl)           and
        (phsa <= 13)           and
        (lvgcl >=650)          and
        (ctl < 4)              and
        (lvgt >= 800)
     then begin NIV :=5:SUIT := tycl;end;
  end;
10: {=============================================
if LNGCL = 6 and TYCL = minor
and (TY2CL = minor or TY2CL inexisting)
```

```
and LNG2CL < 5
and vulnerability = not R/V
and CTL < 4 and H <= 11
and PHCL >= 7   (ADV)      +++++ better : loose <=100
and position = 3
then open 3 TYCL.
=================================================}
begin
   with PLAYER [J_C]
     do if (lngcl = 6)       and
          MINOR (tycl)       and
          (MINOR (ty2cl)     or    (lng2cl < 4)) and
          (lng2cl < 5)       and
          (VULNERABILITY <> NORTH-SOUTH) and
          (ctl < 4)          and
          (point_h < 12)     and
          (SUIT [tycl]. looses <= 100) and
          (position = 3)
     then begin NIV := 3:SUIT :=tycl;end;
end;
```

```
DATA   SEGMENT COMMON   'DATA'
       INCLUDE C:XDATA.LIB
       INCLUDE C:YDATA.LIB
DATA   ENDS
       EXTRN       ORA:FAR
       EXTRN       INF:FAR
       EXTRN       DUMF:FAR
       EXTRN       DIV6:FAR
       EXTRN       TETE:FAR
       EXTRN       POSHL:FAR
       EXTRN       CARTGI:FAR
       EXTRN       GYAFB:FAR
       EXTRN       YAATFX:FAR
       EXTRN       DIRHL:FAR
       EXTRN       PTDC:FAR
       EXTRN       GTDC1:FAR
       EXTRN       DIFFF:FAR
       EXTRN       POSJW:FAR
       EXTRN       PLI:FAR
       EXTRN       GTDTX:FAR
       EXTRN       ATT:FAR
       EXTRN       GTDC:FAR
       EXTRN       PBFIMM:FAR
       EXTRN       GTDX:FAR
SCODE  SEGMENT PUBLIC 'SCODE'
       ASSUME   CS:SCODE,DS:DATA,ES:DATA
XYZT   PROC     FAR
;
;
;
;
       PUBLIC CHOIX
;
       PAGE
NOMOVE:
       MOV    SI,WORD PTR ZONE+28
       MOV    BH,BYTE PTR [SI+1]
       MOV    AL,BH
       CMP    AL,0
```

(A)

```
            JNZ     LAB0
            RET
LAB0:
            MOV     BL,BYTE PTR [SI]
            PUSHF
            INC     BX
            POPF
            PUSHF
            INC     BX
            POPF
            MOV     BYTE PTR [BX],0FFH
            MOV     BYTE PTR [SI+1],0
            MOV     BYTE PTR [SI],0
            RET

MOVE:
            MOV     SI,WORD PTR ZONE+28
            MOV     BL,BYTE PTR [SI-2]
            MOV     BH,BYTE PTR [SI-1]
            MOV     AL,BH
            CMP     AL,0
            JZ      NOLIB
            PUSHF
            INC     BX
            POPF
            PUSHF
            INC     BX
            POPF
            MOV     BYTE PTR [BX],0FFH
;
NOLIB:
            MOV     BL,BYTE PTR [SI]
            MOV     BH,BYTE PTR [SI+1]
            MOV     BYTE PTR [SI-2],BL
            MOV     BYTE PTR [SI-1],BH
            MOV     BYTE PTR [SI+1],0
            MOV     BYTE PTR [SI],0
            RET
            PAGE
-CHOIX:
            MOV     BYTE PTR ZONE+30,AL
            MOV     WORD PTR [ZONE+28],SI
            SUB     AL,AL
            MOV     BYTE PTR ZONE+52,AL
            MOV     BYTE PTR ZONE+54,AL
            MOV     BYTE PTR ZONE+66,AL
            MOV     AL,BH
            CMP     AL,0
            JNZ     LAB1
            JMP     MOVE
LAB1:
            MOV     AL,DH
            CMP     AL,0
            JNZ     LAB2
            JMP     NOMOVE
LAB2:
CHOIX0:
            MOV     WORD PTR [ZONE+28],SI
            SUB     AL,AL
            MOV     BYTE PTR ZONE+52,AL
            MOV     BYTE PTR ZONE+54,AL
            MOV     BYTE PTR ZONE+66,AL
            MOV     BYTE PTR COUPUR,AL
```

```
        PUSH    BX
        POP     SI
        MOV     WORD PTR [ZONE+175],BX
        MOV     AL,BYTE PTR [SI+2]
        CMP     AL,0FFH
        JNZ     LAB3
        JMP     MOVE
LAB3:
        CMP     AL,0
        JNZ     LAB4
        JMP     MOVE
LAB4:
        AND     AL,0FH
        MOV     CH,AL
        PUSH    DX
        POP     SI
        MOV     WORD PTR [ZONE+177],DX
        MOV     AL,BYTE PTR [SI+2]
        CMP     AL,0FFH
        JNZ     LAB5
        JMP     NOMOVE
LAB5:
        CMP     AL,0
        JNZ     LAB6
        JMP     NOMOVE
LAB6:
        AND     AL,0FH
        CMP     AL,CH
        JC      JAIMV
        MOV     AL,CH
JAIMV:
        MOV     BYTE PTR ZONE+69,AL
        LD      BC,(ZONE+4)
        MOV     CX,12
        MOV     AL,1
        MOV     BYTE PTR ZONE+148,AL
        SUB     AL,AL
        MOV     BYTE PTR ZONE+26,AL
        MOV     BYTE PTR ZONE+27,AL
        ADD     SI,CX
IX0:
        MOV     AL,BYTE PTR [SI]
        CMP     AL,0
        JNZ     IX00
        PUSHF
        INC     SI
        POPF
        JMP     IX0
IX00:
        PUSH    SI
        POP     DX
        ADD     BX,CX
HL0:
        MOV     AL,BYTE PTR [BX]
        CMP     AL,0
        JNZ     HL00
        PUSHF
        INC     BX
        POPF
        JMP     HL0
HL00:
        MOV     WORD PTR [ZONE+52],BX
        MOV     WORD PTR [ZONE+54],DX
        MOV     CX,WORD PTR ZONE+70
```

```
            PUSHF
            DEC     CX
            POPF

MOV     AL,BYTE PTR INFO+19
            CMP     AL,0FFH
            JNZ     LAB7
            JMP     DIFFF
LAB7:
            PAGE
GETDIF:
            PUSH    SI
            MOV     SI,DX
            MOV     AL,BYTE PTR [SI]
            POP     SI
            CMP     AL,[BX]
            JNZ     YADIF
GETDIO:
            PUSHF
            INC     DX
            POPF
            PUSHF
            INC     BX
            POPF
            DEC     CL
            JNZ     GETDIF
            JMP     NOMOVE

YADIF:
            MOV     AL,CL
            CMP     AL,0
            JNZ     LAB8
            CALL    FAR PTR DUMP
LAB8:
            MOV     SI,OFFSET ZONE+70
            CMP     AL,[SI]
            JC      LAB9
            CALL    FAR PTR DUMP
LAB9:
            PUSH    CX
            CALL    FAR PTR DIV6
            POP     CX
            CMP     AL,4
            JZ      GETDIO
            CMP     AL,5
            JNZ     LAB10
            JMP     DIFENT
LAB10:
            MOV     CL,AL
            MOV     AL,3
            SUB     AL,CL
            JNC     LAB11
            CALL    FAR PTR DUMP
LAB11:
            MOV     CL,AL
            INC     AL
            MOV     BYTE PTR ZONE+66,AL
            DEC     AL
            MOV     CH,0
            CALL    FAR PTR  ORA
            SUB     BX,CX
            XCHG    DX,BX
            CALL    FAR PTR  ORA
```

```
SUB     BX,CX
XCHG    DX,BX
PAGE
PUSH    BX
POP     SI
PUSH    DX
POP     DI
PUSHF
DEC     SI
POPF
PUSHF
DEC     SI
POPF
PUSHF
DEC     DI
POPF
PUSHF
DEC     DI
POPF
MOV     WORD PTR [ZONE+179],SI
MOV     WORD PTR [ZONE+181],DI
MOV     WORD PTR [ZONE+158],DX
MOV     WORD PTR [ZONE+48],BX
MOV     WORD PTR [ZONE+64],CX
MOV     DX,OFFSET ZONE+72
MOV     CX,4
PUSH    SI
PUSH    DI
MOV     SI,BX
MOV     DI,DX
CLD
REP     MOVSB
MOV     BX,SI
MOV     DX,DI
POP     DI
POP     SI
MOV     BX,WORD PTR ZONE+48
MOV     CX,4
PUSH    SI
PUSH    DI
MOV     SI,BX
MOV     DI,DX
CLD
REP     MOVSB
MOV     BX,SI
MOV     DX,DI
POP     DI
POP     SI
MOV     BX,WORD PTR ZONE+158
MOV     DX,OFFSET ZONE+72
MOV     CX,4
PUSH    SI
PUSH    DI
MOV     SI,BX
MOV     DI,DX
CLD
REP     MOVSB
MOV     BX,SI
MOV     DX,DI
POP     DI
POP     SI
MOV     BX,WORD PTR ZONE+158
```

```
            MOV     CX,4
            PUSH    SI
            PUSH    DI
            MOV     SI,BX
            MOV     DI,DX
            CLD
            REP     MOVSB
            MOV     BX,SI
            MOV     DX,DI
            POP     DI
            POP     SI
            MOV     SI,WORD PTR ZONE+48
            MOV     AL,BYTE PTR [SI-2]
            MOV     BYTE PTR ZONE+21,AL
            CMP     AL,5
            JC      LAB12
            CALL    FAR PTR DUMP
LAB12:
            DEC     AL
            MOV     CL,AL
            PAGE
            MOV     BX,OFFSET ZONE+72
            ADD     BX,CX
            XCHG    DX,BX
            MOV     BX,OFFSET ZONE+22
            ADD     BX,CX
            XCHG    DX,BX
            PUSH    BX
            PUSH    DX
            MOV     CX,4
            MOV     DX,OFFSET INFO+41
            PUSH    SI
            PUSH    DI
            MOV     SI,BX
            MOV     DI,DX
            CLD
            REP     MOVSB
            MOV     BX,SI
            MOV     DX,DI
            POP     DI
            POP     SI
            POP     DX
            POP     BX
;
            MOV     CL,4
            MOV     SI,OFFSET INFO+41       (D)
INITO:
            PUSH    SI
            MOV     SI,DX
            MOV     AL,BYTE PTR [SI]
            POP     SI
            MOV     BYTE PTR [SI],AL
            CMP     AL,[BX]
            PUSHF
            PUSHF
            INC     BX
            POPF
            PUSHF
            DEC     CX
            POPF
            CPI
            PUSHF
            INC     DX
            POPF
            PUSHF
```

```
            INC     SI
            POPF
            POPF
            JZ      INITO
            MOV     AL,4
            SUB     AL,CL
            JNC     LAB13
            CALL FAR PTR DUMP
LAB13:
            JNZ     LAB14
            CALL FAR PTR DUMP
LAB14:
            PAGE
            MOV     BYTE PTR ZONE+148,AL
            PUSHF
            DEC     DX
            POPF
            PUSH    SI
            MOV     SI,DX
            MOV     AL,BYTE PTR [SI]
            POP     SI
            AND     AL,0FH
            MOV     BYTE PTR ZONE+26,AL
            PUSHF
            DEC     BX
            POPF
            MOV     AL,BYTE PTR [BX]
            AND     AL,0FH
            MOV     BYTE PTR ZONE+27,AL
            MOV     AL,BYTE PTR ZONE+21
            ADD     AL,CL
            MOV     AH,AL
            TEST    AH,1H
            JNZ     INITNS
            MOV     DL,1
            JMP     INITNW
INITNS:
            MOV     DL,0
INITNW:
            MOV     AL,BYTE PTR ZONE+151
            CMP     AL,1H
            JNZ     NOIMPO
            MOV     AL,BYTE PTR INFO+93
            MOV     DL,AL
NOIMPO:
            MOV     CL,0
            MOV     CH,0
            CALL FAR PTR TETE
            MOV     AL,BYTE PTR INFO+18
            CMP     AL,0FFH
            JZ      SSTRA

MOV     AL,BYTE PTR TRESDG
            CMP     AL,0
            JZ      LAB15
            CALL FAR PTR ATT
LAB15:
            MOV     AL,BYTE PTR STDC+24
            CMP     AL,0
            JNZ     OBJ2
SSTRA:
            MOV     AL,BYTE PTR INFO+20
            MOV     CH,AL
            MOV     AL,0
            CMP     AL,DL
            MOV     AL,BYTE PTR [SI]
```

```
        JZ      IDECL
        CMP     AL,CH
        MOV     AL,BYTE PTR [DI]
        JC      IDEFY
        CMP     AL,CH
        JNC     LAB16
        JMP     MOVE
LAB16:
        JMP     OBJ2
        PAGE
IDEFY:
        CMP     AL,CH
        JC      LAB17
        JMP     NOMOVE
LAB17:
        JMP     OBJ0
;
IDECL:
        CMP     AL,CH
        MOV     AL,BYTE PTR [DI]
        JC      IDECX
        CMP     AL,CH
        JNC     LAB18
        JMP     NOMOVE
LAB18:
        JMP     OBJ2
IDECX:
        CMP     AL,CH
        JC      LAB19
        JMP     MOVE
LAB19:
OBJ0:
        MOV     DH,0
        JMP     OBJ9
OBJ2:
        MOV     DH,1
OBJ9:
        MOV     AL,BYTE PTR INFO+18
        CMP     AL,0FFH
        JZ      PASATT
        CALL    FAR PTR PBFIMM
        JNZ     PASATT
        CALL    FAR PTR YAAIFX
        CALL    FAR PTR ATT

;
PASATT:
        MOV     AL,BYTE PTR INFO+119
        CMP     AL,0EBH
        JNZ     NOANIV
        MOV     AL,DL
        CMP     AL,0
        JNZ     NOANIV
        MOV     AL,0ABH
        MOV     BYTE PTR COUFUR,AL

MOV     AL,BYTE PTR INFO+19
        CMP     AL,0FFH
        JNZ     LAB20
        CALL    FAR PTR CARTGI
LAB20:

CALL    FAR PTR CARTGI
LAB21:

SUB     AL,AL
```

```
        MOV     BYTE PTR COUPUR,AL

MOV     AL,BYTE PTR ZONE+154
        PUSH    DX
        MOV     CL,10
        CALL    FAR PTR GTDC1
        POP     DX
        CMP     AL,2
        JZ      PROB
        CMP     AL,1
        JNZ     NOANIV
PROB:
        CALL    FAR PTR IMPTET
        JZ      IMPASS

TET:
        CALL    FAR PTR CARTGI
        JMP     NOANIV
        PAGE
IMPASS:
        CALL    FAR PTR TETE
        MOV     AL,BYTE PTR [SI]
        CMP     AL,[DI]
        JNZ     NOANIV

MOV     AL,BYTE PTR CARMXD
        AND     AL,0FH
        MOV     CL,AL
        MOV     AL,BYTE PTR ZONE+27
        CMP     AL,CL
        JC      INF27
        MOV     AL,BYTE PTR ZONE+26
        CMP     AL,CL
        JNC     NOANIV
        JMP     MOVE
INF27:
        MOV     AL,BYTE PTR ZONE+26
        CMP     AL,CL
        JC      NOANIV
        JMP     NOMOVE

NOANIV:
        MOV     BX,WORD PTR ZONE+177    (F)
        CALL    FAR PTR TETE
        JMP     BX

DIFENT:
        MOV     WORD PTR [ZONE+179],BX
        MOV     WORD PTR [ZONE+181],DX
        PUSH    SI
        MOV     SI,DX
        MOV     AL,BYTE PTR [SI]
        POP     SI
        AND     AL,1
        MOV     DL,AL
        MOV     AL,BYTE PTR [BX]
        AND     AL,1
        CMP     AL,DL
        JZ      LAB22
        CALL    FAR PTR DUMP
```

```
LAB22:
        JMP     INITNW
IMPTET:
        PUSH    DX
        MOV     AL,BYTE PTR ZONE+154
        MOV     CL,1
        CALL    FAR PTR GTDC1
        POP     DX
        CMP     AL,52
        JNC     IMPT1
LIMPAS:
        CMP     AL,AL
        RET
IMPT1:
        CMP     AL,56
        JNC     ENTETE
        PUSHF
        DEC     BX
        POPF
        MOV     AL,BYTE PTR [BX]
        CMP     AL,9
        JC      LIMPAS
ENTETE:
        CALL    FAR PTR OPA
        RET

XYZT    ENDP
SCODE   ENDS
        END
```

I claim:

1. Bridge game apparatus having a first computer system comprising a microprocessor, memories, and input and output units including at least one alphanumeric keyboard, a display screen, and a playing card reader, wherein the microprocessor of said first computer system comprises:

means for controlling said input and output units in response to being connected to at least one of the following two elements:

a prerecorded pre-dealt deal module comprising a memory in which the deals are recorded, means for connecting to the microprocessor of said first computer system, means for selecting one of the deals recorded in the memory, means for reconstructing the deal by attributing cards to player positions, means for inputting bids made by the players, means for comparing bids entered by said inputting means with bids recorded in the memory, and means for displaying the optimum final contract together with prerecorded comments; and an intelligent play module removably connected to the microprocessor of said first computer system for analyzing the essential stages of the game including bidding, opening, and card play on an arbitrary deal when taking the place of at least one player, said analysis being performed by means of a second computer system comprising microprocessors and memories containing knowledge bases with the rules of the game for bidding, for opening, and for card play, data bases containing all of the information accessible to the replaced player, and inference engines for applying the rules of the knowledge bases to the information in the data bases, for recording significant results, and for updating the data bases, in order to determine each action of the player replaced by the second computer system; and means for causing said first computer system to operate as an instructional apparatus when connected to the prerecorded pre-dealt deal module and for causing said first computer system to operate as a high level play apparatus when said first computer system is connected to the intelligent play module of said second computer system.

2. Apparatus according to claim 1, wherein the deal module and the intelligent play module in combination are removable from the apparatus.

3. Apparatus according to claim 1, wherein the intelligent play module of the second computer system comprises a master microprocessor associated with a program memory and a work memory, and slave microprocessors associated with program memories and working memories and connected to the master microprocessor in order to execute independent tasks simultaneously.

4. Bridge game apparatus having a first computer system comprising a microprocessor, memories, and input and output units including at least one alphanumeric keyboard, a display screen, and a playing card reader, wherein the microprocessor of said first computer system comprises;

means for controlling said input and output units in response to being connected to at least one of the following two elements:

a prerecorded pre-dealt deal module comprising a memory in which the deals are recorded, means for connecting to the microprocessor of said first computer system, means for selecting one of the deals recorded in the memory, means for reconstructing the deal by attributing cards to player positions, means for inputting bids made by the players, means for comparing bids entered by said inputting means with bids recorded in the memory, and means for displaying the optimum final contract together with prerecorded comments; and an intelligent play module in the form of a second computer system comprising micro-processors, memories containing knowledge bases corresponding to the rules of bridge for bidding, opening, and card play, means for connecting said intelligent play module to the microprocessor of said first computer system, means for analyzing the various stages of the game on a given deal in the place of at least one player, and means for determining during each stage of the game the best action for the replaced player; and means for causing said first computer system to operate as an instructional apparatus when said first computer system is connected to the prerecorded pre-dealt deal module and for causing said first computer system to operate as a high level play apparatus when said first computer system is connected to the intelligent play module of said second computer system.

wherein said first computer system comprises a board in which the microprocessor of said first computer system is housed, said board being fitted with four display screen, four keyboards, and four card readers, each screen being associated with one of the keyboards and one of the readers at a place for a player.

5. Apparatus according to claim 4, comprising at least one independent box containing a playing card reader, an alphanumeric keyboard, and means for connecting via electrical conductors, infrared radiation, or ultrasound to the microprocessor of said first computer system controlling the inlet and outlet units.

6. Apparatus according to claim 4, wherein the board of said first computer system includes a central display screen placed between two of the above-mentioned screens for constituting, together therewith, a large-sized screen.

7. Apparatus according to claim 4, wherein along the sides of the board of said first computer system there are indicator means for indicating locations for playing cards.

8. A method of playing bridge by means of a computer system comprising a microprocessor, memories, and input and output units having at least one display screen, an alphanumeric keyboard and a playing card reader, the method comprising the steps of:

controlling said input and output units by means of the microprocessor; and analyzing the essential stages of the game including bidding, opening, and card play on an arbitrary deal when taking the place of at least one player, said analysis being performed by means of a second computer system comprising microprocessors and memories containing knowledge bases with the rules of the game for bidding, for opening, and for card play, data bases containing all of the information accessible to the replaced player, and inference engines for applying the rules of the knowledge basis to the information in the data bases, for recording significant results, and for updating the data bases, in order to determine each action of the player replaced by the second computer system.

9. The method of playing bridge according to claim 8, said method further comprising the steps of using the microprocessor to control the various input and output units in order to:

record the number of players present and their places;

select a deal in a memory containing a determined number of recorded deals;

reconstruct the selected deal by reading the playing cards and displaying the place of the player to receive each card as read; and input each bid from each player present, compare that bid with a corresponding bid prerecorded in the memory, correct it if necessary, display the final contract, together with the prerecorded comments, and keep a score.

10. A method according to claim 9, further comprising the step of displaying the bid made by a player so long as it is identical with the bid prerecorded in memory, and otherwise in requesting the same player to make a different bid and then in displaying the correct bid as recorded in the memory.

11. A method according to claim 9 or 10, comprising the step of, after card play by the players present, displaying the essential stages of the game prerecorded in memory, together with an appropriate commentary.

12. A method according to claim 11, wherein for bidding, it comprises the steps of selecting a first knowledge base in the memory of the second computer system, said first base containing rules for decoding bids made by the other players, a second knowledge base containing rules for producing bids, five data bases respectively containing information on the cards held by the player replaced by the system, information on cards deemed to be held by its partner, information deduced from the bids made by the replaced player, information on the cards held by said player and the cards probably held by its partner, and information deduced from the bids of the opponents, then in applying the rules of the knowledge bases successively to the information in the data bases in order to determine the best bid.

13. A method according to claim 12, wherein in order to produce a bid, it comprises the steps of decoding the bid made by the partner of the replaced player an din recording that information in a data base, then in producing the bid of the replaced player and in recording the corresponding information in a data, and then in decoding said bid using the rules of the first knowledge base and recording the corresponding information in the corresponding data base.

14. A method according to claim 11, wherein, for opening, the method comprises the steps of selecting two knowledge bases containing rules for selecting a suit and rules for selecting a card within a suit, and four data bases containing information corresponding respectively to the cards of the replaced player, to that player's bids, to the bids of its partner, and to the bids of their opponents, then initially selecting a suit by applying the corresponding rules to the data bases, and subsequently determining the opening card in a manner similar to that in which the opening suit was determined.

15. A method according to claim 14, wherein when two suits may be used for opening, the method comprises the steps of attributing a weight to each suit and to the corresponding card within the suit, in summing the weights of the suit and the card, and in comparing the sums in order to determine the opening card.

16. A method according to claim 11, wherein, for card play, the method comprises the step of not selecting those data bases which contain the cards of the opponents of the replaced player when the replaced player is the declarer, and in selecting them and using them when the replaced player is an opponent of the declarer.

17. A method according to claim 16, characterized in that for each card to be played, the method comprises the steps of initially determining which cards should not be played, then simulating play using the remaining cards by proceeding as follows:
- dynamic analysis of play context and establishing a dynamic data base;
- tactical analysis of play suit-by-suit and simulating the game in part; and
- then strategic analysis of the entire game with full simulation using all suits.

18. A method according to claim 17, comprising the steps of continuously re-checking the data of the dynamic data base, in changing them if necessary each time new information is acquired, and in repeating all of the simulations each time new information is acquired which was not previously known or predicted.

19. A method according to claim 17 or 18, comprising the steps of recording in the dynamic data base: firstly information such as the distribution of cards in the various suits, the ways in which the declarer and dummy may get the lead, and the suits to be ruffed, to be unblocked, and to be discarded, and secondly functions to be optimized consisting, for example, in taking the lead, in giving to partner, in not giving the lead to an opponent, and in attempting a finesse on a given card.

* * * * *

UNITED STATES PATENT AND TRADEMARK OFFICE
CERTIFICATE OF CORRECTION

Page 1 of 2

PATENT NO. : 5,200,890
DATED : April 6, 1993
INVENTOR(S) : Philippe Pionchon

It is certified that error appears in the above-indentified patent and that said Letters Patent is hereby corrected as shown below:

On the Title page, item [54], col. 1, line 3, and col. 1, line 3, "Constructing" should be -- Instructing --.

Column 5, line 50, after "to" insert -- a--.

Column 7, line 1, after "14" insert -- and --.

Column 7, line 13, after "is" ubsert -- made, which contract is necessarily identical to the final --.

Column 8, line 50, "to" (second occurrence) should be -- a--.

Column 12, line 8, after "routines" insert --; --.

Column 12, line 12, after "C-D" insert --: --.

Column 12, line 13, after "D-E" inert --: --.

Column 39, line 8, after "comprises" the semicolon (;) should be a colon-- : --.

Column 39, line 45, "screen" should be -- screens --.

UNITED STATES PATENT AND TRADEMARK OFFICE
CERTIFICATE OF CORRECTION

PATENT NO. : 5,200,890
DATED : April 6, 1993
INVENTOR(S) : Philippe Pionchon

It is certified that error appears in the above-indentified patent and that said Letters Patent is hereby corrected as shown below:

Column 40, line 60, "an din" should be -- and is --.

Column 40, line 63, after "data" insert -- base --.

Column 40, line 67, "claim 11" should be -- claim 8 --.

Column 41, line 16, "claim 11" should be -- claim 8 --.

Signed and Sealed this

Twenty-first Day of December, 1993

Attest:

BRUCE LEHMAN

*Attesting Officer*  *Commissioner of Patents and Trademarks*